Nov. 24, 1936.  W. H. HOBBY  2,062,057

AUTOMOBILE LICENSE PLATE HOLDER

Filed Sept. 21, 1934

Inventor
William H. Hobby
By Lloyd W. Patch
his Attorney

Patented Nov. 24, 1936

2,062,057

UNITED STATES PATENT OFFICE 2,062,057

AUTOMOBILE LICENSE PLATE HOLDER

William H. Hobby, Miami, Fla.

Application September 21, 1934, Serial No. 744,981

1 Claim. (Cl. 40—125)

My invention relates to improvements in automobile license plate holders, and particularly to a locking fastening device intended and adapted for use in mounting and securing license plates on automobiles, and in other connections for mounting, securing and fastening plates or other members in position and for retaining the same against unauthorized removal, or loss or casual displacement.

An object of my invention is to provide a simple and inexpensive device that can be used in mounting an automobile license plate upon the usual supporting bracket structure, can be used in mounting and supporting sign plates, and can be employed in various other connections, and which device will secure the plate or other supported member permanently in place and will guard against theft or loss.

Another object is to so construct the parts that as the locking fastening device is assembled, the parts can be readily interfitted without the use of special appliances or tools and yet the parts cannot be disassembled from the locked position and relation without damage or destruction of the fastening device itself, and also probably the license tag or other member supported and fastened thereby.

A further object is to provide a device of this character which can be used in various places and with various members, and which will adapt itself to the particular thickness of material and to each peculiar and individual use or installation.

With the above and other objects in view, which will be apparent to those skilled in the art, my invention includes certain novel features of construction and combinations and cooperation of parts, which will be hereinafter more fully set forth in connection with the drawing and then pointed out in the claim.

Figure 1:
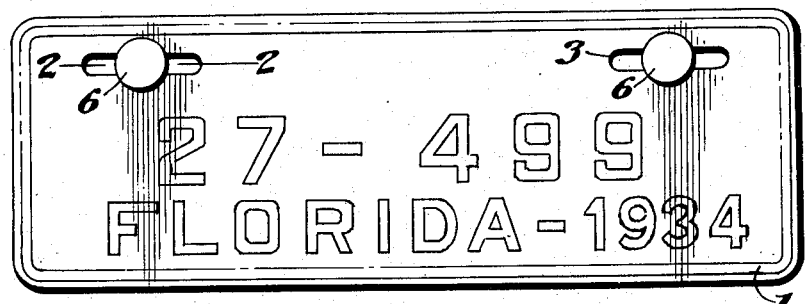
Figure 1 is a view in front elevation showing an automobile license tag with my invention applied thereto.

In the present instance I have shown my invention as particularly constructed and adapted for use in supporting, securing, fastening and locking a license plate upon the usual license plate bracket of an automobile; but, it will be appreciated that the device is adaptable for use in many other connections and for many other purposes, and that the structure is susceptible of changes to suit various conditions of use, while retaining the main features and embodiments of the invention.

In the drawing I have shown the license plate 1 as being of substantially standard form and construction, and the license plate supporting bracket 2 is also intended to be any ordinary or usual bracket structure. It is customary to provide elongated slots 3 in the license plate and provide openings 4 in the bracket 2, which openings 3 and 4 will register to receive fastenings. Heretofore, a large number of automobile owners have resorted to the use of bolts and nuts for securing the license plate in place, and while attempts have been made to provide special mounting and fastening means for automobile license plates, for the most part these have not met with public favor and acceptance, due to the fact that the structures are perhaps complicated in their construction and assembly, are not conveniently usable and practicable, or do not offer any material improvement or advantage over the ordinary fastening bolt. The device of my invention does attain very great advantages over an ordinary bolt, or other similar fastening, inasmuch as the fastening device can be instantaneously inserted in place and assembled, and when once assembled the parts are positively locked and held against disassembly or displacement, except by the application and use of considerable force and/or by cutting, or other destruction of the fastening, the tag, the bracket, or other parts.

The locking member 5 has a head portion 6, in the present instance shown as being substantially in the form of a circular disc, and the bifurcated locking portion 7 has the two spring-like locking fingers 8 and 9 thereof provided with detent spurs 10 and 11. The ends of the locking fingers 8 and 9 are beveled or rounded, as at 12, outwardly toward the detent spurs 10 and 11.

The locking body 13, is here shown as conveniently made to be of substantially parabolical shape, and is provided with a recess 14 entering from its flat or plane end. This recess is preferably made substantially of rectangular form at its entering end, and is of sufficient width to receive the width of the two spring finger portions 8 and 9, but is not so wide as to permit free entrance of the locking spur projections 10 and 11. Inwardly from the entering end, the recess 14 is enlarged to provide locking shoulders 15, and a reentrant rib 16 is preferably provided at the inner end of the recess.

This locking body 13 is thus in effect provided at its flat or plane end with an opening that will not pass the spurred outer ends of the locking portion 7 of the lock member 5, but as the ends of the spring finger portions 8 and 9 are sloped or rounded off, pressure exerted upon the head portion 6 of the lock member will cause the finger portions 8 and 9 to flex sufficiently to allow passage of the projecting spur portions through the entrance of the recess 14, and due to the resiliency of the finger portions 8 and 9 these locking spurs 10 and 11 will be sprung out to engage back of the shoulders 15, within the recess 14. The central rib 16 will perhaps serve to prevent twisting or lateral movement between the locking body and the lock member, and due to the fact that the locking body 13 is entirely closed at its outer end no access can be had to tamper with the lock engagement of the portion 7.

Figure 2:
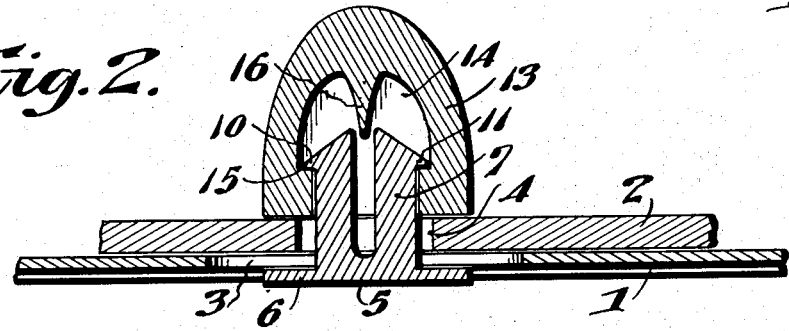
Fig. 2 is an enlarged sectional view taken substantially on line 2—2 of Figure 1.
Figure 3:
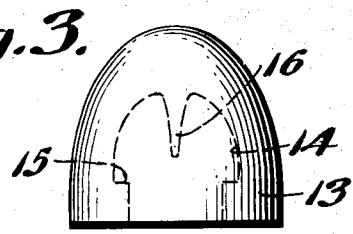
Fig. 3 is a view in side elevation to better show the locking body.

In Figs. 1 and 2 I have shown the device of my invention as it will be fitted for use in holding an automobile license plate in proper place upon the usual mounting bracket, and it will be seen that the head portion 6 of the lock member 5 engages with the license plate 1, while the flat or plane face of the locking body 13 engages with the face of the mounting bracket 2. These parts will serve to effectively and securely hold and support the license plate in position, and as the locking spurs 10 and 11 are caught against the shoulders 15, and no access can be had to release this engagement or otherwise tamper with the locking parts, the tag is secured and is positively locked and held against removal and against casual displacement or loss.

Figure 7:
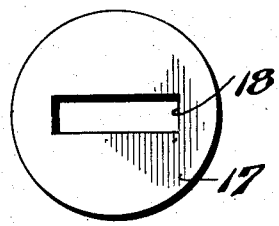
Fig. 7 is a view in elevation showing a cushion washer adaptable for use with my invention.
Figure 4:
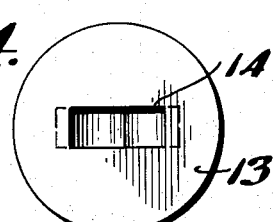
Fig. 4 is a view in end elevation of the body as illustrated in Fig. 3.
Figure 8:
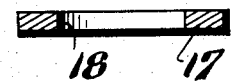
Fig. 8 is a sectional view through the washer illustrated in Fig. 7.
Figure 5:
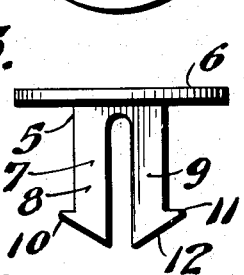
Fig. 5 is a view in side elevation of the lock member.

In some instances it may be found desirable or necessary to fill out slightly between the inner or clamping faces of the lock member 5 and the locking body 13, and this is readily accomplished by the use of a washer 17, illustrated in Figs. 7 and 8, which can be made of rubber, fiber, soft metal, or any other material that may be desired. This washer has a substantially rectangular opening 18 therethrough and thus the washer is readily fitted over the portion 7 of the lock member, and over the locking spurs 10 and 11.

Figure 9:
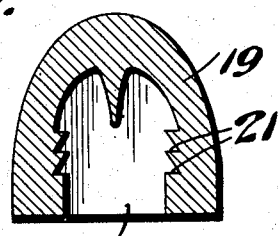
Fig. 9 is a sectional view through a modified form of locking body.
Figure 6:
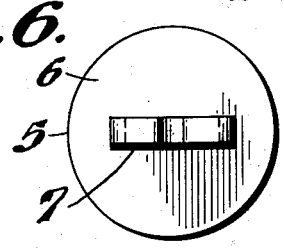
Fig. 6 is a view in end elevation of the member as shown in Fig. 5.

In some instances it may be desired to adapt the fastening device for use with various thicknesses of materials or members to be fastened and locked together, and this can be accomplished by the modified construction illustrated in Fig. 9. As here shown, the locking body 19 has a recess 20 therein, and inwardly from the flat face of the body 19 this recess 20 is provided with a plurality of spaced shoulder portions 20. The locking spurs 10 and 11 of the lock member 5 can be engaged with any one of the oppositely disposed sets of shoulders 20, and thus provision is made for adjustment in the spacing between the clamping faces of the head 6 and the body 19.

As has been stated, in assembling and locking this fastening it is only necessary to insert the portion 7 of the lock member through suitable openings in the members to be supported and fastened, to place the locking body with the tapered or rounded end portions 12 received in the recess 14, and to then exert sufficient pressure to move the portions 7 into the recess 14, so that the locking spurs 10 and 11 will pass and will expand out to engage behind the shoulders 15. When the parts have been assembled in this manner, the fastening device serves as an effective and efficient lock which defies separation or release of the parts, except by the use of such force as will destroy the parts, and probably disfigure and destroy, or render useless, the automobile license tag or other part as thus supported and locked.

While the head portion 6 is here illustrated as being substantially in the form of a flat circular disc, this might be the supporting base for a glass jewel or reflector, can be constructed as a base or support for a lodge, club, or other insignia, and in fact, can be of any desired shape, form, construction and design. Likewise, the locking body 13 can be of different shapes and forms. In any event, the parts will fit very closely to the plate and support, or other members secured thereby, and there are no recesses or spaces to collect dust, mud, grease, or other dirt, as is the case with the ordinary bolt or screw, or other fastenings now ordinarily employed.

From the foregoing it will be seen that I have provided a locking fastening device of simple and inexpensive construction, that can be used in supporting, securing and locking in place automobile license tags, signs, plates or sheets of material, and in fact can be employed in supporting, fastening and locking substantially any form or type of structure, and which is so constructed and assembled that when the device is fitted in place the parts cannot be removed without appreciable and perceptible damage to and/or destruction of the parts.

While I have herein shown and described only certain specific embodiments of my invention and have suggested only certain possible modifications and different adaptations, it will be appreciated that many changes and variations can be made in the form, construction, arrangement, assembly, and use of the parts, without departing from the spirit and scope of my invention.

I claim:

An automobile license plate holder comprising, in combination, a license plate provided with an elongated fastener receiving opening of usual form, a license plate bracket having an elongated fastener receiving opening aligned with the corresponding opening of the plate when said license plate is fitted against the bracket, a holding locking member provided with an enlarged head and having an extending flattened and widened shank portion to fit through and hold against turning within the aligned openings of the license plate and the bracket, said flattened shank portion being bifurcated through its lesser dimension to provide two extending resilient arms, said bifurcated resilient arm portions having laterally extending shoulder projections on the outer edges thereof spaced from the head and with the shoulders faced toward the head, and a locking body having a recess opening through one side and closed on all other sides, said recess being adapted to receive the bifurcated resilient arm portions when the same are flexed inwardly and the recess being provided on opposite sides with laterally and inwardly faced shoulders behind which the shoulders of the flexible bifurcated arm portions are engaged when said bifurcated ends of the locking member are forced into the recess to thus retain the locking body upon the locking member and hold said parts and the license plate against unauthorized removal from the bracket.

WILLIAM H. HOBBY.